US012211451B2

(12) United States Patent
Zhou et al.

(10) Patent No.: US 12,211,451 B2
(45) Date of Patent: Jan. 28, 2025

(54) PIXEL ARRAY AND DISPLAY PANEL

(71) Applicant: HKC Corporation Limited, Guangdong (CN)

(72) Inventors: Mancheng Zhou, Guangdong (CN); Xinghan Liu, Guangdong (CN); Baohong Kang, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/089,017

(22) Filed: Dec. 27, 2022

(65) Prior Publication Data

US 2024/0005872 A1 Jan. 4, 2024

(30) Foreign Application Priority Data

Jun. 29, 2022 (CN) ........................ 202210751595.9

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0452* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 5,144,288 A * | 9/1992 | Hamada | ............ | G02F 1/133514 345/589 |
| 6,396,554 B1 * | 5/2002 | Matsuda | ........... | G02F 1/136286 349/149 |
| 9,842,889 B2 * | 12/2017 | Chaji | .................. | H10K 59/353 |

(Continued)

FOREIGN PATENT DOCUMENTS

| | | |
|---|---|---|
| CN | 101582241 A * | 11/2009 |
| CN | 110767829 A | 2/2020 |

(Continued)

OTHER PUBLICATIONS

Notice of Opinion for the First Review dated Feb. 1, 2023 received in Chinese Patent Application No. CN 202210751595.9.

*Primary Examiner* — Dorothy Harris
(74) *Attorney, Agent, or Firm* — Scully, Scott, Murphy & Presser, P.C.

(57) ABSTRACT

A pixel array and a display panel are provided in the disclosure. The pixel array includes multiple scan lines, multiple emission lines, multiple data lines, and multiple pixel units, where the multiple data lines are insulated from the plurality of scan lines and the multiple emission lines, each of the multiple pixel units includes a first pixel sub-unit, a second pixel sub-unit, and a third pixel sub-unit, second pixel sub-units and/or third pixel sub-units in the same row are electrically coupled with the same scan line and the same emission line and first pixel sub-units in the same row are electrically coupled with another scan line and another emission line, and first pixel sub-units, and/or third pixel sub-units, and/or second pixel sub-units in the same column are electrically coupled with the same data line.

9 Claims, 7 Drawing Sheets

(56) References Cited

U.S. PATENT DOCUMENTS

| | | | | |
|---|---|---|---|---|
| 10,224,378 | B2 * | 3/2019 | Zhang | H10K 59/353 |
| 2006/0164350 | A1 * | 7/2006 | Kim | G09G 3/3614 345/87 |
| 2007/0126671 | A1 * | 6/2007 | Naoaki | G09G 3/3225 345/77 |
| 2007/0164964 | A1 * | 7/2007 | Ha | G09G 3/3607 345/98 |
| 2007/0290981 | A1 * | 12/2007 | Park | G09G 3/3677 345/100 |
| 2013/0300639 | A1 * | 11/2013 | Kim | G09G 3/3233 257/89 |
| 2015/0162391 | A1 * | 6/2015 | Kim | H10K 50/8428 257/40 |
| 2015/0279278 | A1 | 10/2015 | Park et al. | |
| 2016/0322449 | A1 * | 11/2016 | Pyon | H10K 59/1216 |
| 2017/0124953 | A1 * | 5/2017 | Shim | G09G 3/2018 |
| 2017/0186836 | A1 * | 6/2017 | Tada | G09G 3/2074 |
| 2018/0151106 | A1 * | 5/2018 | Peng | G09G 3/3666 |
| 2019/0043428 | A1 * | 2/2019 | Shim | G09G 3/3258 |
| 2019/0296093 | A1 * | 9/2019 | Liu | H10K 59/353 |
| 2020/0111419 | A1 * | 4/2020 | Shim | G09G 3/3258 |
| 2021/0193036 | A1 * | 6/2021 | Huang | G09G 3/3233 |
| 2021/0399063 | A1 * | 12/2021 | Yamaue | H10K 59/131 |
| 2022/0189391 | A1 | 6/2022 | Yang et al. | |

FOREIGN PATENT DOCUMENTS

| | | | |
|---|---|---|---|
| CN | 111862890 | A | 10/2020 |
| CN | 213751891 | U | 7/2021 |
| WO | 2021254036 | A1 | 12/2021 |

* cited by examiner

PIXEL ARRAY AND DISPLAY PANEL

CROSS-REFERENCE TO RELATED APPLICATIONS

This application claims priority under 35 U.S.C. § 119(a) to Chinese Patent Application No. 202210751595.9, filed Jun. 29, 2022, the entire disclosure of which is incorporated herein by reference.

TECHNICAL FIELD

This disclosure relates to the technical filed of display, and in particular to a pixel array and a display panel.

BACKGROUND

As a new generation of display technology, Organic Light-Emitting Diode (OLED) has characteristics of self-luminescence, energy saving, and a larger viewing angle compared with the traditional display technology. Therefore, in recent years, there are more and more OLED-based display panels. In the current OLED display panel, three sub-pixels of Red (R), Green (G), and Blue (B) are generally used to display one pixel. There are generally two arrangements of RGB. In one arrangement, three sub-pixels RGB in one pixel are arranged in a row, that is, controlled by one scan line; in the other arrangement, three sub-pixels RGB of one pixel are arranged in two rows.

However, since a threshold voltage of the R sub-pixel is lower than that of each of the G sub-pixel and the B sub-pixel, the R sub-pixel is more susceptible to the influence of coupling. When Gamma is automatically debugged, due to the coupling between data lines, both a voltage on the data line of the G sub-pixel and a voltage on the data line of the B sub-pixel will bring coupling effects to a voltage on the data line of the R sub-pixel, affecting the light emission of the R sub-pixel. Once the light emission of the R sub-pixel is affected, a light emission effect of the R sub-pixel is degraded, which leads to a decrease in a brightness of the pure-color R sub-pixel at a low gray level, resulting in gray crush.

SUMMARY

In a first aspect, the disclosure provides a pixel array. The pixel array includes multiple scan lines, multiple emission lines, multiple data lines, and multiple pixel units, where the multiple data lines are insulated from the plurality of scan lines and the multiple emission lines, each of the multiple pixel units includes a first pixel sub-unit, a second pixel sub-unit, and a third pixel sub-unit, second pixel sub-units and/or third pixel sub-units in the same row are electrically coupled with the same scan line and the same emission line and first pixel sub-units in the same row are electrically coupled with another scan line and another emission line, and first pixel sub-units, and/or third pixel sub-units, and/or second pixel sub-units in the same column are electrically coupled with the same data line.

In a second aspect, the disclosure further provides a display panel. The display panel includes a display region, a non-display region, and the pixel array of the first aspect, where the pixel array is located in the display region.

BRIEF DESCRIPTION OF THE DRAWINGS

To illustrate technical solutions in embodiments of the disclosure more clearly, accompanying drawings required in the embodiments will be briefly introduced below. Apparently, the drawings in the following description are some embodiments of the disclosure, and for those skilled in the art, other drawings can also be obtained from these drawings without creative effort.

DETAILED DESCRIPTION

Figure 1:
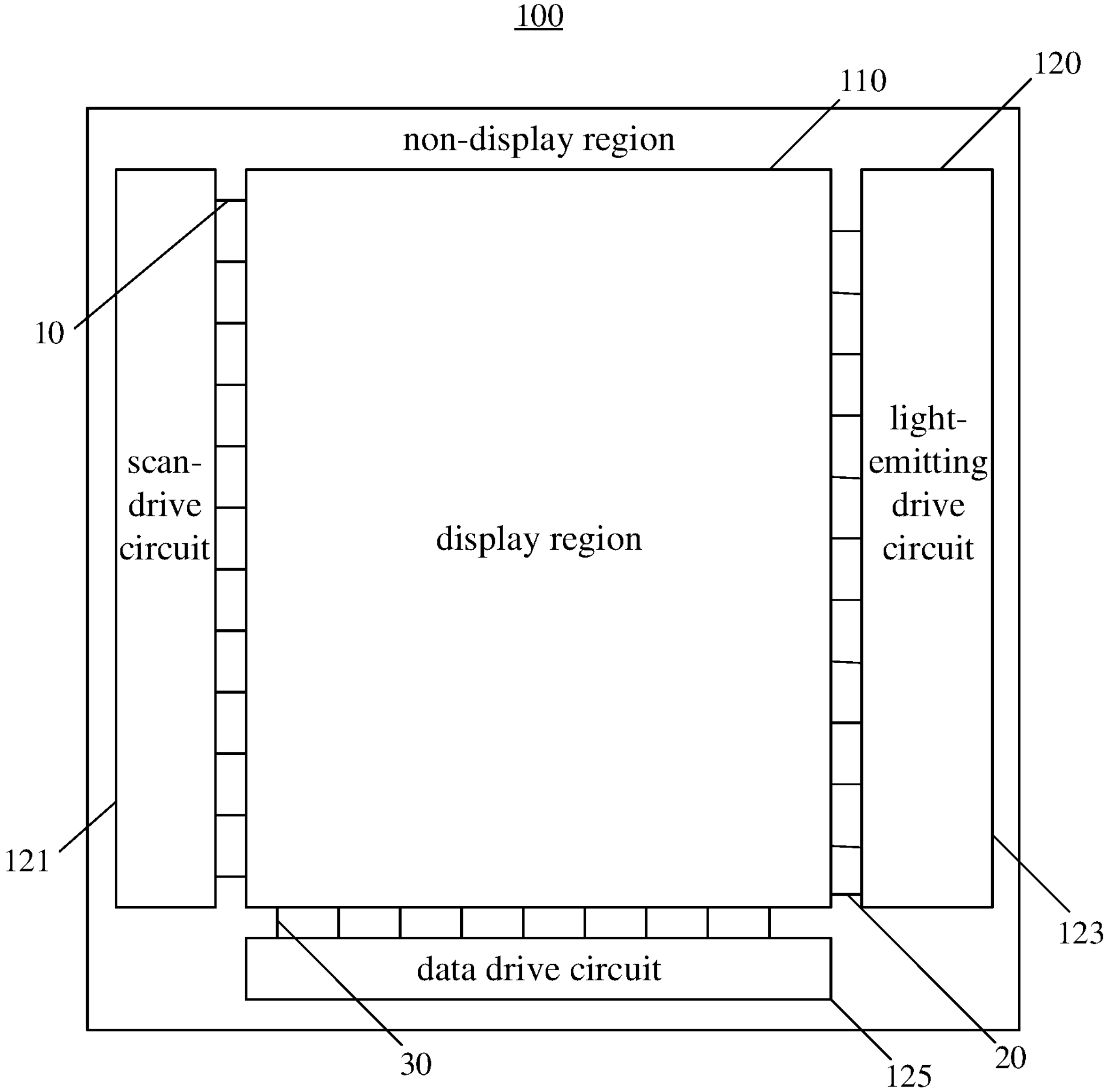
FIG. 1 is a schematic structural diagram of a display panel provided in embodiments of the disclosure.

To facilitate understanding of the disclosure, the disclosure will be described in details below with reference to the related drawings. The preferred implementations of the disclosure are shown in the drawings. However, the disclosure may be implemented in many different forms and is not limited to the implementations described herein. Rather, these implementations are provided for a thorough and complete understanding of the disclosure.

The following descriptions of various embodiments are with reference to the accompanying figures to illustrate the specific embodiments that can be implemented by the disclosure. The serial numbers themselves, such as “first”, “second”, etc., for the components herein are only used to distinguish the described objects, and do not have any order or technical meaning. Further, the “connection” and “coupling” mentioned in the disclosure, unless otherwise specified, include both direct and indirect connection (coupling). Directional terms mentioned in the disclosure, such as “upper”, “lower”, “front”, “rear”, “left”, “right”, “inner”, “outer”, “side”, etc., are merely references of directions of the accompanying drawings. Accordingly, the directional terms are used for better and clearer description and understanding of the disclosure, rather than indicating or implying that the referred device or element must have a particular orientation, be constructed and operate in a particular orientation. Therefore, it should not be construed as a limitation on the disclosure.

In the description of the disclosure, it should be noted that, unless otherwise expressly specified and limited, the terms “installed”, “connected”, and “coupled” should be understood in a broad sense. For example, it may be a fixed connection, a detachable connection, or an integral connection; a mechanical connection; a direct connection, an indirect connection through an intermediate medium, or an internal communication between two components. For those of ordinary skill in the art, the specific meanings of the above terms in the disclosure can be understood in specific situations. It should be noted that the terms “first”, “second” and the like in the description, claims, and drawings of the disclosure are used to distinguish different objects, rather than to describe a specific order.

In addition, the terms “include”, “can include”, “contain”, or “can contain” used in the disclosure indicate the existence of the disclosed corresponding functions, operations, elements, etc., and do not limit other one or more functions, operations, components, etc. Furthermore, the terms "include" or "contain" mean corresponding features, numbers, steps, operations, elements, components, or combinations thereof disclosed in the specification, without excluding the presence or addition of one or more other features, numbers, steps, operations, elements, components, or combinations thereof, and are intended to cover the non-exclusive inclusion. Furthermore, in describing implementations of the disclosure, the use of "can" means "one or more embodiments of the disclosure." Also, the term "exemplary" is intended to refer to an example or illustration.

Unless otherwise defined, all technical and scientific terms used herein have the same meaning as commonly understood by one of ordinary skill in the technical field to which the disclosure belongs. The terms used herein in the specification of the disclosure are for describing the implementations only and are not intended to limit the disclosure.

In view of the above deficiencies of the related art, the disclosure aims to provide a pixel array, to solve the problem that both a voltage on a data line of a G sub-pixel and a voltage on a data line of a B sub-pixel bring coupling effects to a voltage on a data line of a R sub-pixel, thereby alleviating gray crush and improving a light-emitting effect of the R sub-pixel.

To solve the above technical problem, the disclosure provides a pixel array. The pixel array includes multiple scan lines, multiple emission lines, multiple data lines, and multiple pixel units, where the multiple data lines are insulated from the plurality of scan lines and the multiple emission lines, each of the multiple pixel units includes a first pixel sub-unit, a second pixel sub-unit, and a third pixel sub-unit, a second pixel sub-unit(s) and/or a third pixel sub-unit(s) in the same row are electrically coupled with the same scan line and the same emission line and first pixel sub-units in the same row are electrically coupled with another scan line and another emission line, and a first pixel sub-unit(s), and/or a third pixel sub-unit(s), and/or a second pixel sub-unit(s) in the same column are electrically coupled with the same data line.

In some implementations, the same scan line and the same emission line are electrically coupled with the second pixel sub-unit and the third pixel sub-unit in sequence, or the same scan line and the same emission line are electrically coupled with the third pixel sub-unit and the second pixel sub-unit in sequence.

In some implementations, the first pixel sub-unit, the second pixel sub-unit, and the third pixel sub-unit are electrically coupled with different scan lines and different emission lines.

In some implementations, the first pixel sub-unit, the second pixel sub-unit, and the third pixel sub-unit are electrically coupled with different data lines.

In some implementations, the first pixel sub-unit is a red sub-pixel, the second pixel sub-unit is a green sub-pixel, and the third pixel sub-unit is a blue sub-pixel.

In some implementations, the first pixel sub-unit includes a first light-emitting control transistor, a first driving transistor, a first reset transistor, a second light-emitting control transistor, a first switch transistor, a first data control transistor, a second reset transistor, a first storage capacitor, and a first light-emitting diode. A gate of the first light-emitting control transistor is configured to receive a light-emitting control signal, a drain of the first light-emitting control transistor is electrically coupled with a source of the first driving transistor and a source of the second light-emitting control transistor, a source of the first light-emitting control transistor is electrically coupled with a source of the second reset transistor and the first light-emitting diode, and the first light-emitting control transistor is configured to control the first light-emitting diode to emit light. A gate of the first driving transistor is electrically coupled with a second end of the first storage capacitor, a drain of the first reset transistor, and a drain of the second light-emitting control transistor, a drain of the first driving transistor is electrically coupled with a drain of the first switch transistor and a drain of the first data control transistor, the source of the first driving transistor is electrically coupled with the source of the second light-emitting control transistor, and the first driving transistor is configured to control a magnitude of a current flowing through the first light-emitting diode. A gate of the first reset transistor is configured to receive a third scan-drive signal, the drain of the first reset transistor is electrically coupled with the second end of the first storage capacitor and the drain of the second light-emitting control transistor, a source of the first reset transistor is configured to receive a first initialization signal, and the first reset transistor is configured to control initialization of a potential of the first storage capacitor. A gate of the second light-emitting control transistor is configured to receive a first scan-drive signal, the drain of the second light-emitting control transistor is electrically coupled with the second end of the first storage capacitor, and the second light-emitting control transistor is configured to compensate a threshold voltage of the first driving transistor. A gate of the first switch transistor is configured to receive the light-emitting control signal, the drain of the first switch transistor is electrically coupled with the drain of the first data control transistor, a source of the first switch transistor is configured to receive a first voltage and is electrically coupled with a first end of the first storage capacitor, and the first switch transistor is configured to control to supply the first voltage to the first light-emitting diode. A gate of the first data control transistor is configured to receive the first scan-drive signal, a source of the first data control transistor is configured to receive a data voltage, and the first data control transistor is configured to control to charge the first storage capacitor with the data voltage. A gate of the second reset transistor is configured to receive the first scan-drive signal, a drain of the second reset transistor is configured to receive a second initialization signal, the source of the second reset transistor is electrically coupled with the first light-emitting diode, and the second reset transistor is configured to initialize an anode of the first light-emitting diode. The first end of the first storage capacitor is configured to receive the first voltage, the first storage capacitor is configured to change a voltage at the gate of the first driving transistor, and a cathode of the first light-emitting diode is configured to receive a second voltage.

In some implementations, the second pixel sub-unit includes a fourth light-emitting control transistor, a third driving transistor, a fourth reset transistor, a fifth light-emitting control transistor, a third switch transistor, a third data control transistor, a fifth reset transistor, a second storage capacitor, and a second light-emitting diode. A gate of the fourth light-emitting control transistor is configured to receive the light-emitting control signal, a drain of the fourth light-emitting control transistor is electrically coupled with a source of the third driving transistor and a source of the fifth light-emitting control transistor, a source of the fourth light-emitting control transistor is electrically coupled with a source of the fifth reset transistor and the second light-emitting diode, and the fourth light-emitting control transistor is configured to control the second light-emitting diode to emit light. A gate of the third driving transistor is electrically coupled with a second end of the second storage capacitor, a drain of the fourth reset transistor, and a drain of the fifth light-emitting control transistor, a drain of the third driving transistor is electrically coupled with a drain of the third switch transistor and a drain of the third data control transistor, the source of the third driving transistor is electrically coupled with the source of the fifth light-emitting control transistor, and the third driving transistor is configured to control a magnitude of a current flowing through the second light-emitting diode. A gate of the fourth reset transistor is configured to receive the third scan-drive signal, the drain of the fourth reset transistor is electrically coupled with the second end of the second storage capacitor and the drain of the fifth light-emitting control transistor, a source of the fourth reset transistor is configured to receive the first initialization signal, and the fourth reset transistor is configured to control initialization of a potential of the second storage capacitor. A gate of the fifth light-emitting control transistor is configured to receive a second scan-drive signal, the drain of the fifth light-emitting control transistor is electrically coupled with the second end of the second storage capacitor, and the fifth light-emitting control transistor is configured to compensate a threshold voltage of the third driving transistor. A gate of the third switch transistor is configured to receive the light-emitting control signal, the drain of the third switch transistor is electrically coupled with the drain of the third data control transistor, a source of the third switch transistor is configured to receive the first voltage and is electrically coupled with a first end of the second storage capacitor, and the third switch transistor is configured to control to supply the first voltage to the second light-emitting diode. A gate of the third data control transistor is configured to receive the second scan-drive signal, a source of the third data control transistor is configured to receive the data voltage, and the third data control transistor is configured to control to charge the second storage capacitor with the data voltage. A gate of the fifth reset transistor is configured to receive the second scan-drive signal, a drain of the fifth reset transistor is configured to receive the second initialization signal, the source of the fifth reset transistor is electrically coupled with the second light-emitting diode, and the fifth reset transistor is configured to initialize an anode of the second light-emitting diode. The first end of the second storage capacitor is configured to receive the first voltage, the second storage capacitor is configured to change a voltage at the gate of the third driving transistor, and a cathode of the second light-emitting diode is configured to receive the second voltage.

In some implementations, the third pixel sub-unit includes a sixth light-emitting control transistor, a fourth driving transistor, a sixth reset transistor, a seventh light-emitting control transistor, a fourth switch transistor, a fourth data control transistor, a seventh reset transistor, a third storage capacitor, and a third light-emitting diode. A gate of the sixth light-emitting control transistor is configured to receive the light-emitting control signal, a drain of the sixth light-emitting control transistor is electrically coupled with a source of the fourth driving transistor and a source of the seventh light-emitting control transistor, a source of the sixth light-emitting control transistor is electrically coupled with a source of the seventh reset transistor and the third light-emitting diode, and the sixth light-emitting control transistor is configured to control the third light-emitting diode to emit light. A gate of the fourth driving transistor is electrically coupled with a second end of the third storage capacitor, a drain of the sixth reset transistor, and a drain of the seventh light-emitting control transistor, a drain of the fourth driving transistor is electrically coupled with a drain of the fourth switch transistor and a drain of the fourth data control transistor, the source of the fourth driving transistor is electrically coupled with the source of the seventh light-emitting control transistor, and the fourth driving transistor is configured to control a magnitude of a current flowing through the third light-emitting diode. A gate of the sixth reset transistor is configured to receive the third scan-drive signal, the drain of the sixth reset transistor is electrically coupled with the second end of the third storage capacitor, the gate of the fourth driving transistor, and the drain of the seventh light-emitting control transistor, a source of the sixth reset transistor is configured to receive the first initialization signal, and the sixth reset transistor is configured to control initialization of a potential of the third storage capacitor. A gate of the seventh light-emitting control transistor is configured to receive the second scan-drive signal, the drain of the seventh light-emitting control transistor is electrically coupled with the second end of the third storage capacitor, and the seventh light-emitting control transistor is configured to compensate a threshold voltage of the fourth driving transistor. A gate of the fourth switch transistor is configured to receive the light-emitting control signal, the drain of the fourth switch transistor is electrically coupled with the drain of the fourth data control transistor, a source of the fourth switch transistor is configured to receive the first voltage and is electrically coupled with a first end of the third storage capacitor, and the fourth switch transistor is configured to control to supply the first voltage to the third light-emitting diode. A gate of the fourth data control transistor is configured to receive the second scan-drive signal, a source of the fourth data control transistor is configured to receive the data voltage, and the fourth data control transistor is configured to control to charge the third storage capacitor with the data voltage. A gate of the seventh reset transistor is configured to receive the second scan-drive signal, a drain of the seventh reset transistor is configured to receive the second initialization signal, the source of the seventh reset transistor is electrically coupled with the third light-emitting diode, and the seventh reset transistor is configured to initialize an anode of the third light-emitting diode. The first end of the third storage capacitor is configured to receive the first voltage, the third storage capacitor is configured to change a voltage at the gate of the fourth driving transistor, and a cathode of the third light-emitting diode is configured to receive the second voltage.

In conclusion, in the pixel array, the first pixel sub-unit is electrically coupled with the individual scan line, neither the second pixel sub-unit nor the third pixel sub-unit is electrically coupled with the scan line electrically coupled with the first pixel sub-unit, that is, neither the second pixel sub-unit nor the third pixel sub-unit will share the scan line with the first pixel sub-unit. Hence, there are only voltages of the first pixel sub-units on adjacent data lines, and thus the voltage on the data line electrically coupled with the second pixel sub-unit and the voltage on the data line electrically coupled with the third pixel sub-unit will not bring coupling effects to the voltage on the data line electrically coupled with the first pixel sub-unit. As such, the light emission of the first pixel sub-unit will not be affected. Therefore, for the pixel array of the disclosure, the problem of gray crush caused by both the voltage on the data line of the G sub-pixel and the voltage on the data line of the B sub-pixel bringing coupling effects to the voltage on the data line of the R sub-pixel can be solved.

Based on the same inventive concept, the disclosure further provides a display panel. The display panel includes a display region, a non-display region, and the pixel array of the above, where the pixel array is located in the display region.

In conclusion, in the display panel of the disclosure, the first pixel sub-unit is electrically coupled with the individual scan line, neither the second pixel sub-unit nor the third pixel sub-unit is electrically coupled with the scan line electrically coupled with the first pixel sub-unit, that is, neither the second pixel sub-unit nor the third pixel sub-unit will share the scan line with the first pixel sub-unit. Hence, there are only voltages of the first pixel sub-units on adjacent data lines, and thus the voltage on the data line electrically coupled with the second pixel sub-unit and the voltage on the data line electrically coupled with the third pixel sub-unit will not bring coupling effects to the voltage on the data line electrically coupled with the first pixel sub-unit. As such, the light emission of the first pixel sub-unit will not be affected. Therefore, for the pixel array of the disclosure, the problem of gray crush caused by both the voltage on the data line of the G sub-pixel and the voltage on the data line of the B sub-pixel bringing coupling effects to the voltage on the data line of the R sub-pixel can be solved. As such, the overall brightness uniformity and stability of the display panel can be effectively improved.

Based on the same inventive concept, the disclosure further provides a display device. The display device includes the pixel array of the above.

In conclusion, in the display device of the disclosure, the first pixel sub-unit is electrically coupled with the individual scan line, neither the second pixel sub-unit nor the third pixel sub-unit is electrically coupled with the scan line electrically coupled with the first pixel sub-unit, that is, neither the second pixel sub-unit nor the third pixel sub-unit will share the scan line with the first pixel sub-unit. Hence, there are only voltages of the first pixel sub-units on adjacent data lines, and thus the voltage on the data line electrically coupled with the second pixel sub-unit and the voltage on the data line electrically coupled with the third pixel sub-unit will not bring coupling effects to the voltage on the data line electrically coupled with the first pixel sub-unit. As such, the light emission of the first pixel sub-unit will not be affected.

The embodiments of the disclosure desire to provide technical solutions of a pixel array, a display panel, and a display device that can solve the above technical problem. As such, the problem that both a voltage on a data line of a G sub-pixel and a voltage on a data line of a B sub-pixel bring coupling effects to a voltage on a data line of a R sub-pixel can be solved, and gray crush can be alleviated, to improve a light-emitting effect of the R subpixel. The details thereof will be described in subsequent embodiments.

Refer to FIG. 1, which is a schematic structural diagram of a display panel provided in embodiments of the disclosure. As shown in FIG. 1, the disclosure provides a display panel 100. The display panel 100 includes a display region 110 and a non-display region 120. The display region 110 is used for image display, and the non-display region 120 surrounds the display region 110 and is not used for image display. It can be understood that, in some implementations, the display panel 100 may use a liquid crystal material as a display medium, which is not limited in the disclosure. In embodiments of the disclosure, the display panel 100 may be an Organic Light-Emitting Diode (OLED) display panel.

It can be understood that, the display panel 100 can be used for electronic devices including personal digital assistant (PDA) and/or music player functions, such as mobile phones, tablet computers, wearable electronic devices with wireless communication functions (such as smart watches), outdoor display devices (such as mini LED outdoor direct display), etc. The above electronic device may also be other electronic devices, such as a Laptop having a touch-sensitive surface (e.g., a touch panel). In some embodiments, the electronic device may be capable of communication, that is, through 2G (second generation), 3G (third generation), 4G (fourth generation), 5G (fifth generation) cellular communication specification or a wireless local area network (W-LAN), or a communication method that may appear in the future, establishes communication with the network. For the sake of brevity, embodiments of the disclosure are not further limited.

Referring to FIG. 1, the display panel 100 further includes a scan-drive circuit 121, a light-emitting drive circuit 123, and a data drive circuit 125 which are disposed in the non-display region 120. The scan-drive circuit 121 is disposed at one side of the display region 110 and the light-emitting drive circuit 123 is disposed at another side of the display region 110 opposite to the one side. The scan-drive circuit 121 is electrically coupled with multiple scan lines 10, and is used to output scan control signals through the multiple scan lines 10 to control pixel units to receive data signals for image display. The light-emitting drive circuit 123 is electrically coupled with multiple emission lines 20, and is used to output light-emitting control signals through the multiple emission lines 20 to control pixel units to emit light. The data drive circuit 125 is disposed in the non-display region 120 at yet another side of the display region 110. The data drive circuit 125 is electrically coupled with multiple data lines 30, and is used to transmit data driving signals to multiple pixel units in the form of data voltages through the multiple data lines 30. It can be understood that, the multiple scan lines 10, the multiple emission lines 20, the multiple data lines 30, and the pixel units electrically coupled with the multiple scan lines 10, the multiple emission lines 20, and the multiple data lines 30 form a pixel array.

Figure 2:
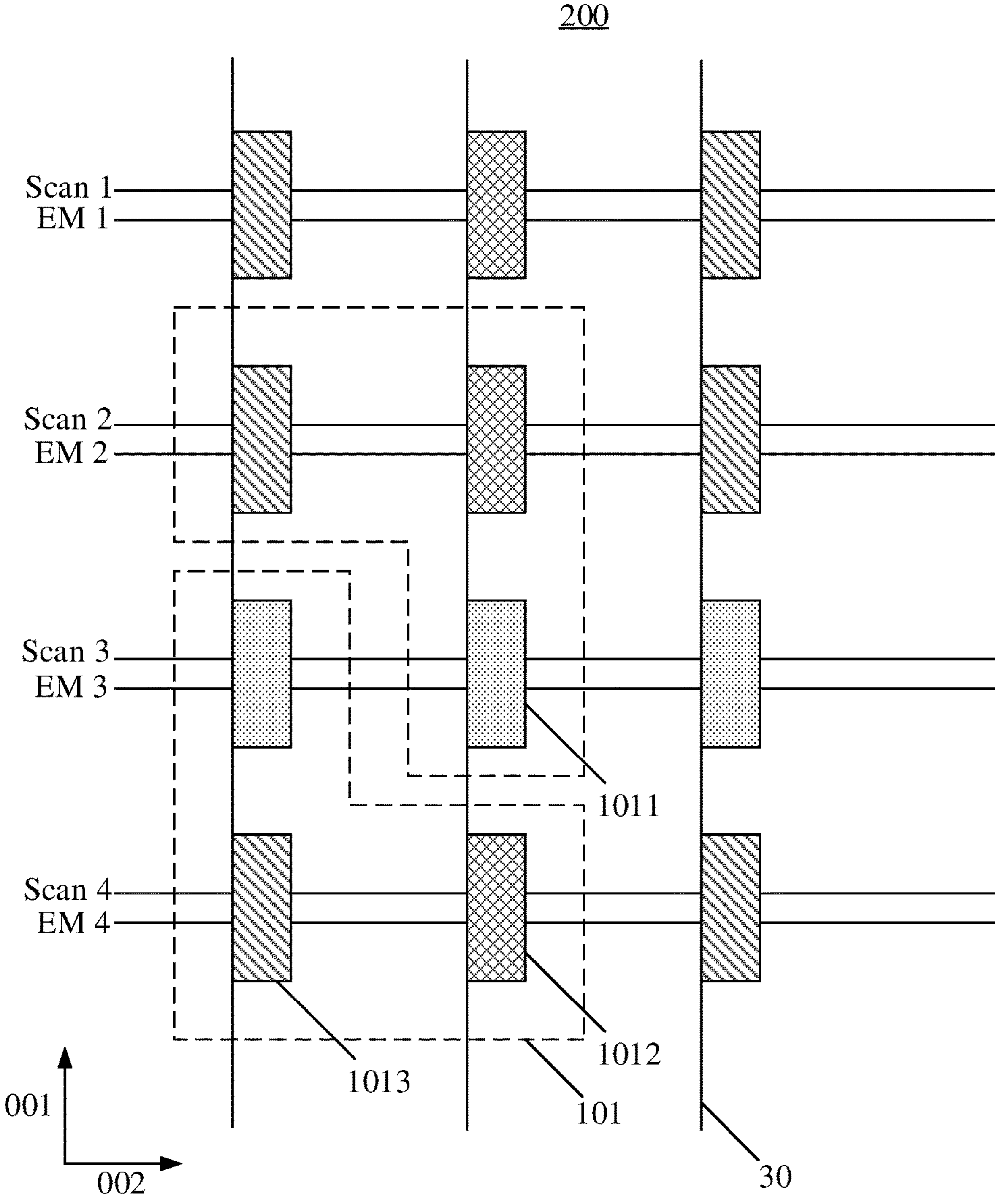
FIG. 2 is a schematic diagram of a circuit of a pixel array provided in the disclosure.

Refer to FIG. 2, which is a schematic diagram of a circuit of a pixel array provided in embodiments of the disclosure. As shown in FIG. 2, the pixel array 200 may at least include multiple scan lines 10, multiple emission lines 20, multiple data lines 30, and multiple pixel units 101. Each of the multiple pixel units 101 includes a first pixel sub-unit 1011, a second pixel sub-unit 1012, and a third pixel sub-unit 1013. The multiple scan lines 10 include a first scan line Scan 1, a second scan line Scan 2, a third scan line Scan 3, and a fourth scan line Scan 4. The first scan line Scan 1, the second scan line Scan 2, the third scan line Scan 3, and the fourth scan line Scan 4 are all insulated from one another and are arranged in parallel in the display region 110, along a first direction 001 and spaced at a first preset distance. The multiple scan lines 10 and the multiple data lines 30 are insulated from one another.

In implementations of the disclosure, the multiple emission lines 20 include a first emission line EM 1, a second emission line EM 2, a third emission line EM 3, and a fourth emission line EM 4. The first emission line EM 1, the second emission line EM 2, the third emission line EM 3, and the fourth emission line EM 4 are all insulated from one another and are arranged in parallel in the display region 110, along the first direction 001 and separated from each other by a second preset distance. The multiple emission lines 20 and the multiple data lines are insulated from one another.

In implementations of the disclosure, the multiple data lines 30 are disposed at corresponding positions in the display region 110, and the multiple data lines 30 are insulated from one another and are arranged in parallel in the display region 110, along a second direction 002 and separated from each other by a third preset distance. The first direction 001 and the second direction 002 are perpendicular to each other.

In other implementations, the multiple data lines 30 can be vertically intersected with and insulated from the multiple scan lines 10 and the multiple emission lines 20. It can be understood that, the multiple data lines 30 can be intersected with the multiple scan lines 10 and the multiple emission lines 20 in other manners, which is not limited in the disclosure. The multiple scan lines 10 and the multiple emission lines 20 are insulated from one another and are arranged in parallel in the display region 110, along the first direction 001 and spaced at a fourth preset distance.

In implementations of the disclosure, to facilitate the description of the arrangement of pixel units in the pixel array, 4*3 pixel sub-units arranged in a matrix is as an example for description. That is, the pixel array includes four rows of pixel sub-units and three columns of pixel sub-units. Specifically, the pixel array includes two pixel units 101, which specifically includes three first pixel sub-unit 1011, three second pixel sub-unit 1012, and six third pixel sub-unit 1013. The second pixel sub-unit 1012 and the third pixel sub-unit 1013 in the same row are both electrically coupled with the same scan line 10 and the same emission line 20, and the first pixel sub-units 1011 in the same row is electrically coupled with another scan line 10 and another emission line 20. The first pixel sub-unit 1011 and the third pixel sub-unit 1013 or the second pixel sub-unit 1012 in the same column are electrically coupled with the same data line 30. That is, the first pixel sub-unit 1011, the second pixel sub-unit 1012, and the third pixel sub-unit 1013 are not simultaneously located in the same column. That is, the first pixel sub-unit 1011 and the second pixel sub-unit 1012 or the third pixel sub-unit 1013 in the same column are electrically coupled with different scan lines 10 and different emission lines 20. It should be understood that, the above examples are only for describing specific implementations, and therefore should not be construed as a limitation on the disclosure.

When the third scan line Scan 3 outputs a scan control signal to control the pixel unit 101 to receive the data signal transmitted through the data line 30 to perform image display, as the first pixel sub-unit 1011 is electrically coupled with the third scan line Scan 3 and neither the second pixel sub-unit 1012 nor the third pixel sub-unit 1013 is electrically coupled with the third scan line Scan 3, there are only voltages of the first pixel sub-units 1011 on adjacent data lines 30, and thus the voltage on the data line 30 electrically coupled with the second pixel sub-unit 1012 and the voltage on the data line 30 electrically coupled with the third pixel sub-unit 1013 will not bring coupling effects to the voltage on the data line 30 electrically coupled with the first pixel sub-unit 1011. Since the threshold voltage of the second pixel sub-unit 1012 is close to the threshold voltage of the third pixel sub-unit 1013, the coupling between the voltage on the data line 30 electrically coupled with the second pixel sub-unit 1012 and the voltage on the data line 30 electrically coupled with the third pixel sub-unit 1013 will be relatively slight. That is, the coupling effect between the voltage on the data line 30 electrically coupled with the second pixel sub-unit 1012 and the voltage on the data line electrically coupled with the third pixel sub-unit 1013 is small.

In implementations of the disclosure, the first pixel sub-unit 1011 may be a red sub-pixel, the second pixel sub-unit 1012 may be a green sub-pixel, and the third pixel sub-unit 1013 may be a blue sub-pixel. It should be understood that, the above examples are only for describing specific implementations, and therefore should not be construed as a limitation on the disclosure.

Figure 3:
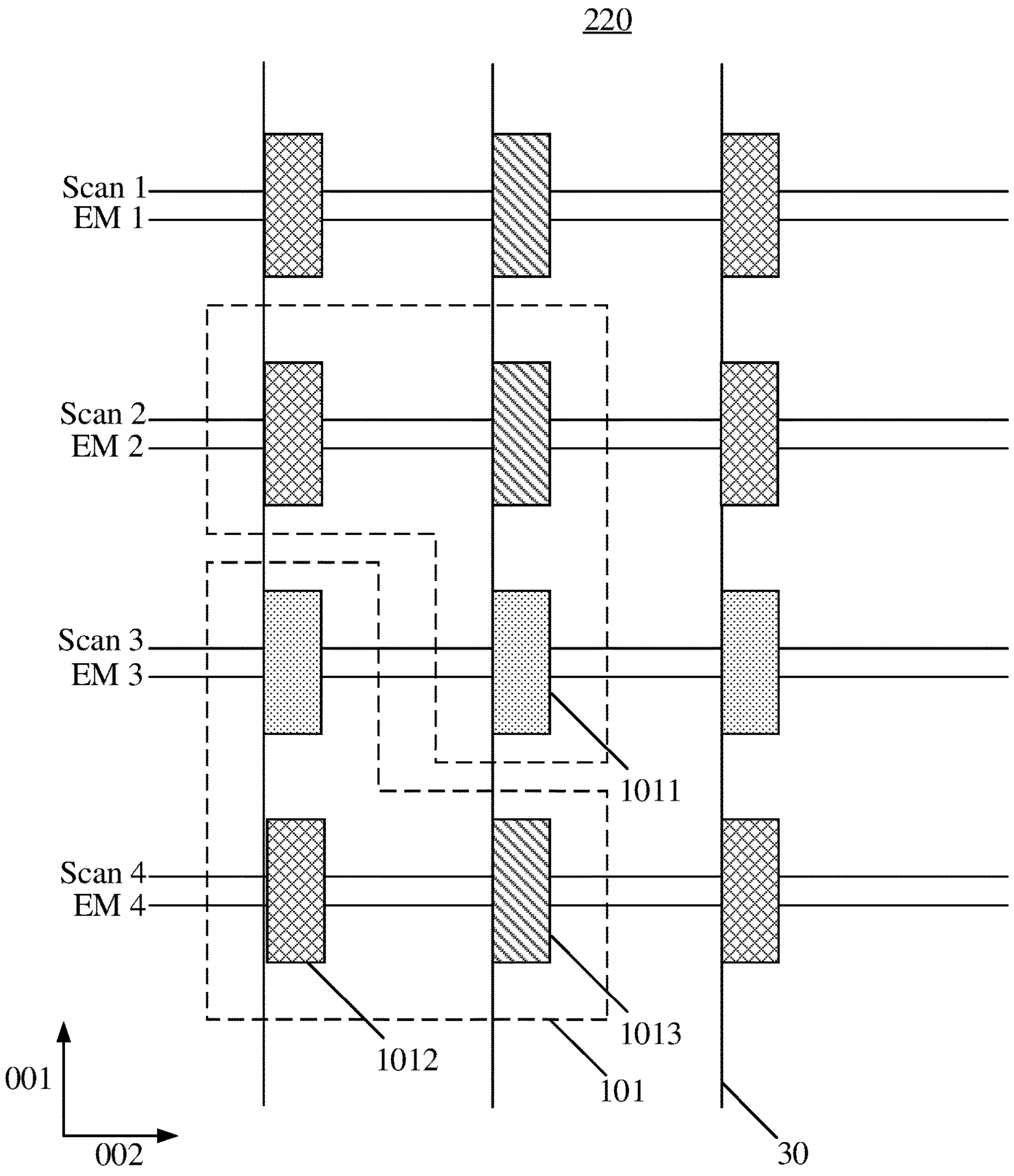
FIG. 3 is a schematic diagram of a circuit of a pixel array provided in embodiments of the disclosure.

Refer to FIG. 3, which is a schematic diagram of a circuit of a pixel array provided in embodiments of the disclosure. The main difference between the pixel array 220 of the embodiment shown in FIG. 3 and the pixel array 200 of the embodiment shown in FIG. 2 is as follows. The order of arrangement of the second pixel sub-unit 1012 and the third pixel sub-unit 1013 which are electrically coupled with the same scan line 10 and the same emission line 20 in FIG. 3 is different that in FIG. 2. Specifically, in embodiments of the disclosure, the same scan line 10 and the same emission line 20 are first electrically coupled with the second pixel sub-unit 1012, and then electrically coupled with the third pixel sub-unit 1013. That is, the same scan line and the same emission line 20 are electrically coupled with the second pixel sub-unit 1012 and the third pixel sub-unit 1013 in sequence.

Accordingly, in the pixel array 200 of the embodiment shown in FIG. 2, the same scan line 10 and the same emission line 20 are first electrically coupled with the third pixel sub-unit 1013, and then electrically coupled with the second pixel sub-unit 1012. That is, the same scan line 10 and the same emission line 20 are electrically coupled with the third pixel sub-unit 1013 and the second pixel sub-unit 1012 in sequence.

Figure 4:
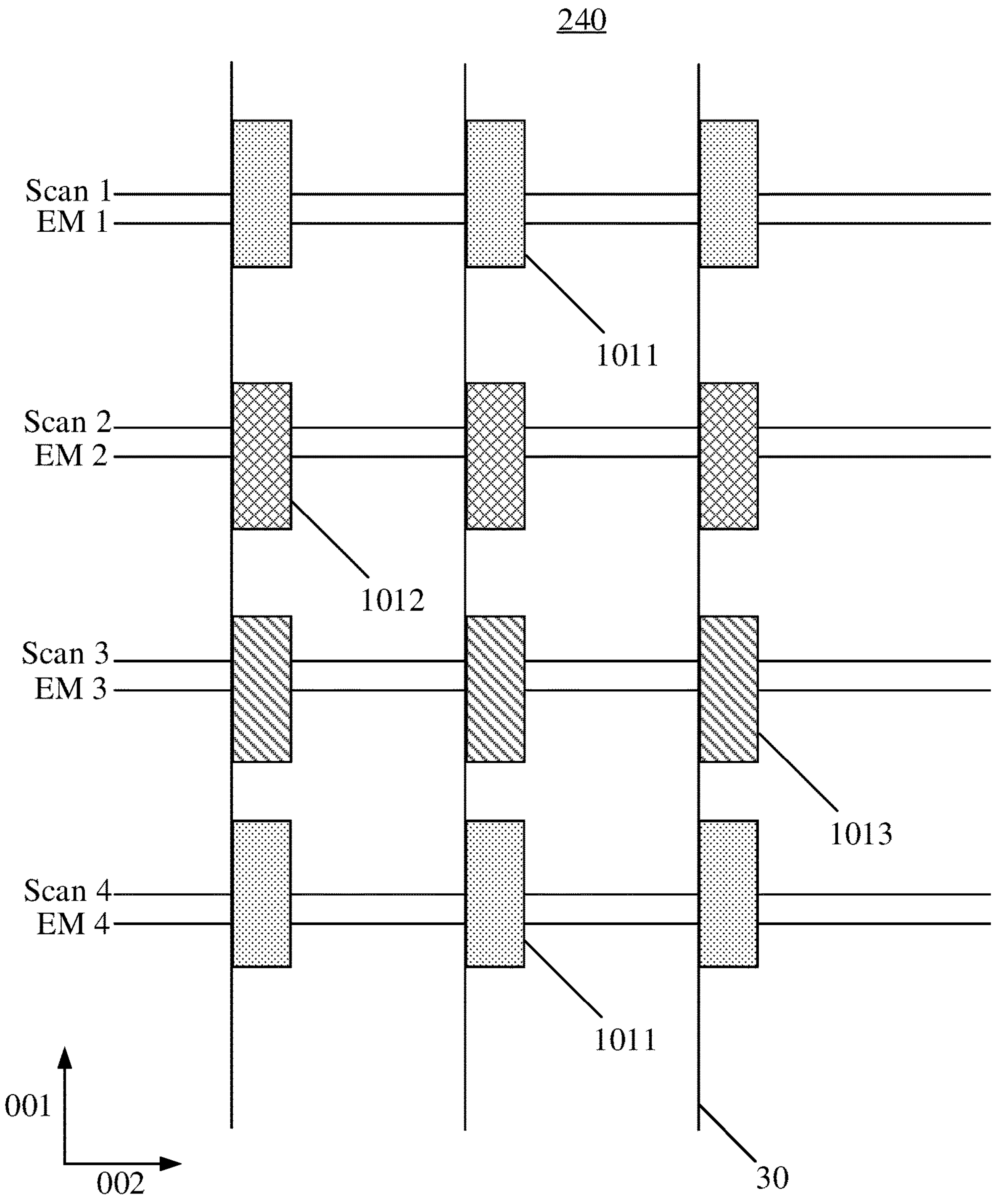
FIG. 4 is a schematic diagram of a circuit of a pixel array provided in embodiments of the disclosure.

Refer to FIG. 4, which is a schematic diagram of a circuit of a pixel array provided in embodiments of the disclosure. The main difference between the pixel array 240 of the embodiment shown in FIG. 4 and the pixel array 200 of the embodiment shown in FIG. 2 is as follows. In the pixel array 240 of the embodiment shown in FIG. 4, the first pixel sub-unit 1011, the second pixel sub-unit 1012, and the third pixel sub-unit 1013 are electrically coupled with different scan lines 10 and different emission lines 20. Specifically, the second pixel sub-units 1012 in the same row are electrically coupled with the same scan line 10 and the same emission line 20, the third pixel sub-units 1013 in the same row are electrically coupled with another scan line 10 and another emission line 20, and the first pixel sub-units 1011 in the same row are electrically coupled with yet another scan line 10 and yet another emission line 20.

Accordingly, in the pixel array 200 of the embodiment shown in FIG. 2, the second pixel sub-unit 1012 and the third pixel sub-unit 1013 in the same row are both electrically coupled with the same scan line 10 and the same emission line 20, and the first pixel sub-units 1011 in the same row is electrically coupled with another scan line 10 and another emission line 20.

Figure 5:
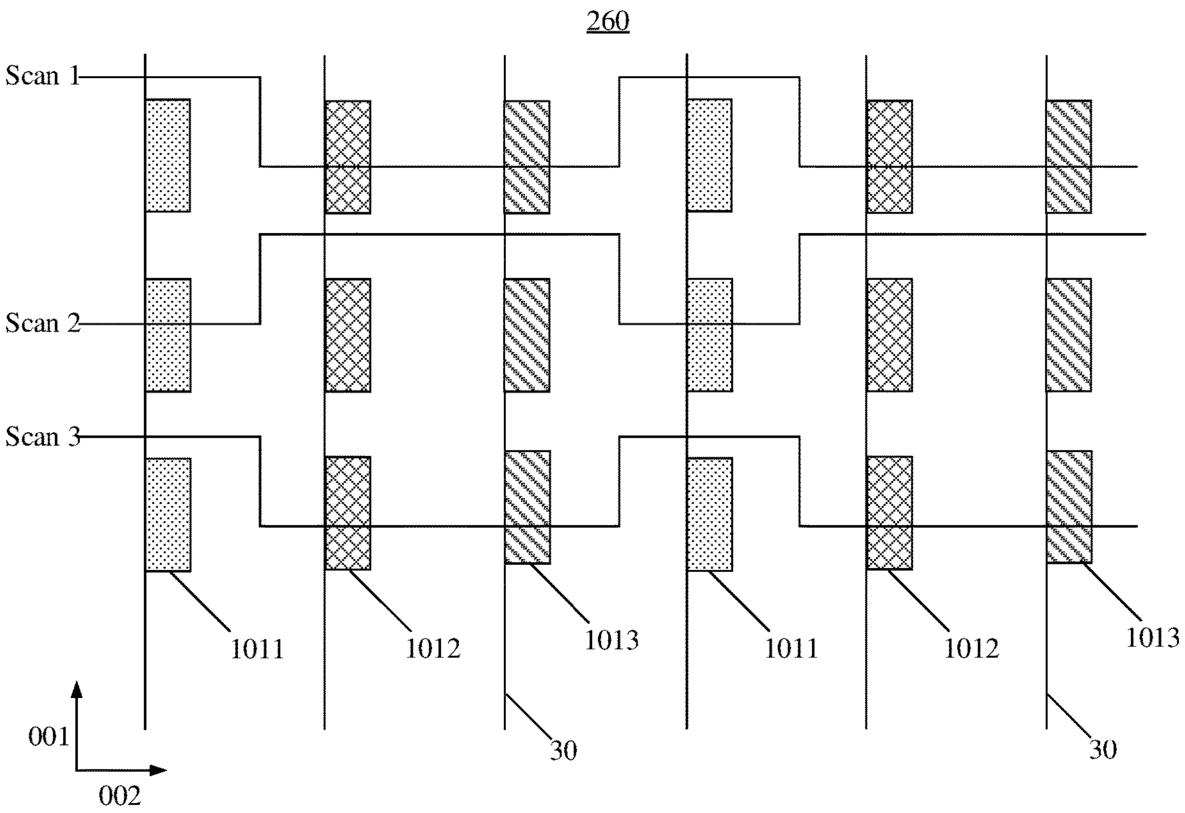
FIG. 5 is a schematic diagram of a circuit of a pixel array provided in embodiments of the disclosure.

Refer to FIG. 5, which is a schematic diagram of a circuit of a pixel array provided in embodiments of the disclosure. The main difference between the pixel array 260 of the embodiment shown in FIG. 5 and the pixel array 200 of the embodiment shown in FIG. 2 is as follows. In the pixel array 260 of the embodiment shown in FIG. 5, the first pixel sub-unit 1011, the second pixel sub-unit 1012, and the third pixel sub-unit 1013 are electronically coupled with different data lines 30. Specifically, the second pixel sub-units 1012 in the same column are electrically coupled with the same data line 30, the third pixel sub-units 1013 in the same column are electrically coupled with another data line 30, and the first pixel sub-units 1011 in the same column are electrically coupled with yet another data line 30.

Accordingly, in the pixel array 200 of the embodiment shown in FIG. 2, the first pixel sub-unit 1011 and the third pixel sub-unit 1013 or the second pixel sub-unit 1012 in the same column are electrically coupled with the same data line 30. That is, the first pixel sub-unit 1011, the second pixel sub-unit 1012, and the third pixel sub-unit 1013 are not simultaneously located in the same column.

In conclusion, in the pixel array, the first pixel sub-unit 1011 is electrically coupled with the individual scan line 10, neither the second pixel sub-unit 1012 nor the third pixel sub-unit 1013 is electrically coupled with the scan line 10 electrically coupled with the first pixel sub-unit 1011, that is, neither the second pixel sub-unit 1012 nor the third pixel sub-unit 1013 will share the scan line 10 with the first pixel sub-unit 1011. Hence, there are only voltages of the first pixel sub-units 1011 on adjacent data lines 30, and thus the voltage on the data line 30 electrically coupled with the second pixel sub-unit 1012 and the voltage on the data line 30 electrically coupled with the third pixel sub-unit 1013 will not bring coupling effects to the voltage on the data line 30 electrically coupled with the first pixel sub-unit 1011. As such, the light emission of the first pixel sub-unit 1011 will not be affected. Therefore, for the pixel array of the disclosure, the problem of gray crush caused by both the voltage on the data line 30 of the G sub-pixel and the voltage on the data line of the B sub-pixel bringing coupling effects to the voltage on the data line 30 of the R sub-pixel can be solved. As such, the overall brightness uniformity and stability of the display panel can be effectively improved.

Figure 6:
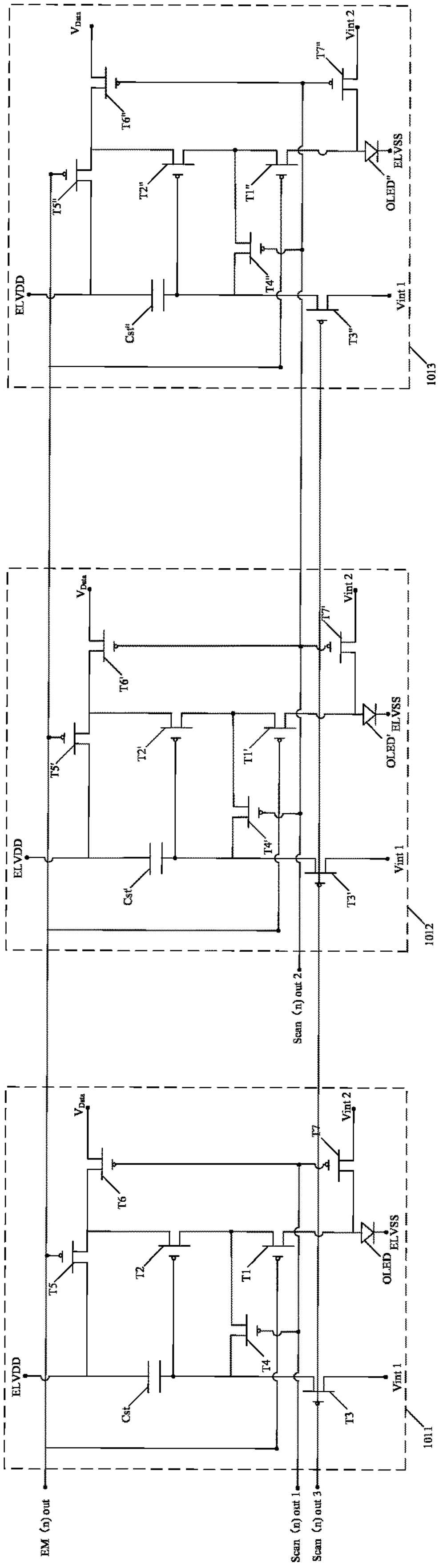
FIG. 6 is a schematic structural diagram of a partial circuit of the pixel array shown in FIG. 5.

Refer to FIG. 6, which is a schematic diagram of a partial circuit structure of the pixel array shown in FIG. 5. As shown in FIG. 6, the first pixel sub-unit 1011 in the pixel array 260 provided in the disclosure may at least include a first light-emitting control transistor T1, a first driving transistor T2, a first reset transistor T3, a second light-emitting control transistor T4, a first switch transistor T5, a first data control transistor T6, a second reset transistor T7, a first storage capacitor Cst, and a first light-emitting diode OLED.

A gate of the first light-emitting control transistor T1 is configured to receive a light-emitting control signal EM (n) out, a drain of the first light-emitting control transistor T1 is electrically coupled with a source of the first driving transistor T2 and a source of the second light-emitting control transistor T4, a source of the first light-emitting control transistor T1 is electrically coupled with a source of the second reset transistor T7 and the first light-emitting diode OLED, and the first light-emitting control transistor T1 is configured to control the first light-emitting diode OLED to emit light.

A gate of the first driving transistor T2 is electrically coupled with a second end of the first storage capacitor Cst, a drain of the first reset transistor T3, and a drain of the second light-emitting control transistor T4, a drain of the first driving transistor T2 is electrically coupled with a drain of the first switch transistor T5 and a drain of the first data control transistor T6, the source of the first driving transistor T2 is electrically coupled with the drain of the first light-emitting control transistor T1 and the source of the second light-emitting control transistor T4, and the first driving transistor T2 is configured to control a magnitude of a current flowing through the first light-emitting diode OLED.

A gate of the first reset transistor T3 is configured to receive a third scan-drive signal Scan (n) out 3, the drain of the first reset transistor T3 is electrically coupled with the second end of the first storage capacitor Cst, the gate of the first driving transistor T2, and the drain of the second light-emitting control transistor T4, a source of the first reset transistor T3 is configured to receive a first initialization signal Vint 1, and the first reset transistor T3 is configured to control initialization of a potential of the first storage capacitor Cst.

A gate of the second light-emitting control transistor T4 is configured to receive a first scan-drive signal Scan (n) out 1. The drain of the second light-emitting control transistor T4 is electrically coupled with the second end of the first storage capacitor Cst, the gate of the first driving transistor T2, and the drain of the first reset transistor T3. The source of the second light-emitting control transistor T4 is electrically coupled with the source of the first driving transistor T2 and the drain of the first light-emitting control transistor T1. The second light-emitting control transistor T4 is configured to compensate a threshold voltage Vth of the first driving transistor T2.

A gate of the first switch transistor T5 is configured to receive the light-emitting control signal EM (n) out, the drain of the first switch transistor T5 is electrically coupled with the drain of the first driving transistor T2 and the drain of the first data control transistor T6, a source of the first switch transistor T5 is configured to receive a first voltage ELVDD and is electrically coupled with a first end of the first storage capacitor Cst, and the first switch transistor T5 is configured to control to supply the first voltage ELVDD to the first light-emitting diode OLED.

A gate of the first data control transistor T6 is configured to receive the first scan-drive signal Scan (n) out 1. The drain of the first data control transistor T6 is electrically coupled with the drain of the first driving transistor T2 and the drain of the first switch transistor T5. A source of the first data control transistor T6 is configured to receive a data voltage $V_{data}$. The first data control transistor T6 is configured to control to charge the first storage capacitor Cst with the data voltage Vaasa.

A gate of the second reset transistor T7 is configured to receive the first scan-drive signal Scan (n) out 1, a drain of the second reset transistor T7 is configured to receive a second initialization signal Vint 2, the source of the second reset transistor T7 is electrically coupled with the source of the first light-emitting control transistor T1 and the first light-emitting diode OLED, and the second reset transistor T7 is configured to initialize an anode of the first light-emitting diode OLED.

The first end of the first storage capacitor Cst is configured to receive the first voltage ELVDD and is electronically coupled with the source of the first switch transistor T5. The second end of the first storage capacitor Cst is electronically coupled with the gate of the first driving transistor T2, the drain of the first reset transistor T3, and the drain of the second light-emitting control transistor T4. The first storage capacitor Cst is configured to change a voltage at the gate of the first driving transistor T2.

The anode of the first light-emitting diode OLED is coupled with the source of the first light-emitting control transistor T1 and the source of the second reset transistor T7, and a cathode of the first light-emitting diode OLED is configured to receive a second voltage ELVSS.

In implementations of the disclosure, the first light-emitting diode OLED may be a red organic light-emitting diode.

The second pixel sub-unit 1012 can at least include a fourth light-emitting control transistor T1', a third driving transistor T2', a fourth reset transistor T3', a fifth light-emitting control transistor T4', a third switch transistor T5', a third data control transistor T6', a fifth reset transistor T7', a second storage capacitor Cst', and a second light-emitting diode OLED'.

A gate of the fourth light-emitting control transistor T1' is configured to receive the light-emitting control signal EM (n) out, a drain of the fourth light-emitting control transistor T1' is electrically coupled with a source of the third driving transistor T2' and a source of the fifth light-emitting control transistor T4', a source of the fourth light-emitting control transistor T1' is electrically coupled with a source of the fifth reset transistor T7' and the second light-emitting diode OLED', and the fourth light-emitting control transistor T1' is configured to control the second light-emitting diode OLED' to emit light.

A gate of the third driving transistor T2' is electrically coupled with a second end of the second storage capacitor Cst', a drain of the fourth reset transistor T3', and a drain of the fifth light-emitting control transistor T4', a drain of the third driving transistor T2' is electrically coupled with a drain of the third switch transistor T5' and a drain of the third data control transistor T6', the source of the third driving transistor T2' is electrically coupled with the drain of the fourth light-emitting control transistor T1' and the source of the fifth light-emitting control transistor T4', and the third driving transistor T2' is configured to control a magnitude of a current flowing through the second light-emitting diode OLED'.

A gate of the fourth reset transistor T3' is configured to receive the third scan-drive signal Scan (n) out 3, the drain of the fourth reset transistor T3' is electrically coupled with the second end of the second storage capacitor Cst', the gate of the third driving transistor T2', and the drain of the fifth light-emitting control transistor T4', a source of the fourth reset transistor T3' is configured to receive the first initialization signal Vint 1, and the fourth reset transistor T3' is configured to control initialization of a potential of the second storage capacitor Cst'.

A gate of the fifth light-emitting control transistor T4' is configured to receive a second scan-drive signal Scan (n) out 2. The drain of the fifth light-emitting control transistor T4' is electrically coupled with the second end of the second storage capacitor Cst', the gate of the third driving transistor T2', and the drain of the fourth reset transistor T3'. The source of the fifth light-emitting control transistor T4' is electronically coupled with the source of the third driving transistor T2' and the drain of the fourth light-emitting control transistor T1'. The fifth light-emitting control transistor T4' is configured to compensate a threshold voltage Vth of the third driving transistor T2'.

A gate of the third switch transistor T5' is configured to receive the light-emitting control signal EM (n) out, the drain of the third switch transistor T5' is electrically coupled with the drain of the third driving transistor T2' and the drain of the third data control transistor T6', a source of the third switch transistor T5' is configured to receive the first voltage ELVDD and is electrically coupled with a first end of the second storage capacitor Cst', and the third switch transistor T5' is configured to control to supply the first voltage ELVDD to the second light-emitting diode OLED'.

A gate of the third data control transistor T6' is configured to receive the second scan-drive signal Scan (n) out 2. The drain of the third data control transistor T6' is electronically coupled with the drain of the third driving transistor T2' and the drain of the third switch transistor T5'. A source of the third data control transistor T6' is configured to receive the data voltage Vaasa. The third data control transistor T6' is configured to control to charge the second storage capacitor Cst' with the data voltage Vaasa.

A gate of the fifth reset transistor T7' is configured to receive the second scan-drive signal Scan (n) out 2, a drain of the fifth reset transistor T7' is configured to receive the second initialization signal Vint 2, the source of the fifth reset transistor T7' is electrically coupled with the source of the fourth light-emitting control transistor T1' and the second light-emitting diode OLED', and the fifth reset transistor T7' is configured to initialize an anode of the second light-emitting diode OLED'.

The first end of the second storage capacitor Cst' is configured to receive the first voltage ELVDD and is electronically coupled with the source of the third switch transistor T5'. The second end of the second storage capacitor Cst' is coupled with the gate of the third driving transistor T2', the drain of the fourth reset transistor T3', and the drain of the fifth light-emitting control transistor T4'. The second storage capacitor Cst' is configured to change a voltage at the gate of the third driving transistor T2'.

The anode of the second light-emitting diode OLED' is coupled with the source of the fourth light-emitting control transistor T1' and the source of the fifth reset transistor T7'. A cathode of the second light-emitting diode OLED' is configured to receive the second voltage ELVSS.

In implementations of the disclosure, the second light-emitting diode OLED' may be a green organic light-emitting diode.

The third pixel sub-unit 1013 can at least include a sixth light-emitting control transistor T1", a fourth driving transistor T2", a sixth reset transistor T3", a seventh light-emitting control transistor T4", a fourth switch transistor T5", a fourth data control transistor T6", a seventh reset transistor T7", a third storage capacitor Cst", and a third light-emitting diode OLED".

A gate of the sixth light-emitting control transistor T1" is configured to receive the light-emitting control signal EM (n) out, a drain of the sixth light-emitting control transistor T1" is electrically coupled with a source of the fourth driving transistor T2" and a source of the seventh light-emitting control transistor T4", a source of the sixth light-emitting control transistor T1" is electrically coupled with a source of the seventh reset transistor T7" and the third light-emitting diode OLED", and the sixth light-emitting control transistor T1" is configured to control the third light-emitting diode OLED" to emit light.

A gate of the fourth driving transistor T2" is electrically coupled with a second end of the third storage capacitor Cst", a drain of the sixth reset transistor T3", and a drain of the seventh light-emitting control transistor T4", a drain of the fourth driving transistor T2" is electrically coupled with a drain of the fourth switch transistor T5" and a drain of the fourth data control transistor T6", the source of the fourth driving transistor T2" is electrically coupled with the drain of the sixth light-emitting control transistor T1" and the source of the seventh light-emitting control transistor T4", and the fourth driving transistor T2" is configured to control a magnitude of a current flowing through the third light-emitting diode OLED".

A gate of the sixth reset transistor T3" is configured to receive the third scan-drive signal Scan (n) out 3, the drain of the sixth reset transistor T3" is electrically coupled with the second end of the third storage capacitor Cst", the gate of the fourth driving transistor T2", and the drain of the seventh light-emitting control transistor T4", a source of the sixth reset transistor T3" is configured to receive the first initialization signal Vint 1, and the sixth reset transistor T3" is configured to control initialization of a potential of the third storage capacitor Cst".

A gate of the seventh light-emitting control transistor T4" is configured to receive the second scan-drive signal Scan (n) out 2. The drain of the seventh light-emitting control transistor T4" is electrically coupled with the second end of the third storage capacitor Cst", the gate of the fourth driving transistor T2", and the drain of the sixth reset transistor T3". The source of the seventh light-emitting control transistor T4" is electrically coupled with the source of the fourth driving transistor T2" and the drain of the sixth light-emitting control transistor T1". The seventh light-emitting control transistor T4" is configured to compensate a threshold voltage Vth of the fourth driving transistor T2".

A gate of the fourth switch transistor T5" is configured to receive the light-emitting control signal EM (n) out, the drain of the fourth switch transistor T5" is electrically coupled with the drain of the fourth driving transistor T2" and the drain of the fourth data control transistor T6", a source of the fourth switch transistor T5" is configured to receive the first voltage ELVDD and is electrically coupled with a first end of the third storage capacitor Cst", and the fourth switch transistor T5" is configured to control to supply the first voltage ELVDD to the third light-emitting diode OLED".

A gate of the fourth data control transistor T6" is configured to receive the second scan-drive signal Scan (n) out 2. The drain of the fourth data control transistor T6" is electrically coupled with the drain of the fourth driving transistor T2" and the drain of the fourth switch transistor T5". A source of the fourth data control transistor T6" is configured to receive the data voltage Vaasa. The fourth data control transistor T6" is configured to control to charge the third storage capacitor Cst" with the data voltage $V_{data}$.

A gate of the seventh reset transistor T7" is configured to receive the second scan-drive signal Scan (n) out 2, a drain of the seventh reset transistor T7" is configured to receive the second initialization signal Vint 2, the source of the seventh reset transistor T7" is electrically coupled with the source of the sixth light-emitting control transistor T1" and the third light-emitting diode OLED", and the seventh reset transistor T7" is configured to initialize an anode of the third light-emitting diode OLED".

The first end of the third storage capacitor Cst" is configured to receive the first voltage ELVDD and is electronically coupled with the source of the fourth switch transistor T5". The second end of the third storage capacitor Cst" is electronically coupled with the gate of the fourth driving transistor T2", the drain of the sixth reset transistor T3", and the drain of the seventh light-emitting control transistor T4". The third storage capacitor Cst" is configured to change a voltage at the gate of the fourth driving transistor T2"

The anode of the third light-emitting diode OLED" is electronically coupled with the source of the sixth light-emitting control transistor T1" and the source of the seventh reset transistor T7". A cathode of the third light-emitting diode OLED" is configured to receive the second voltage ELVSS.

In implementations of the disclosure, the third light-emitting diode OLED" may be a blue organic light-emitting diode.

Figure 7:
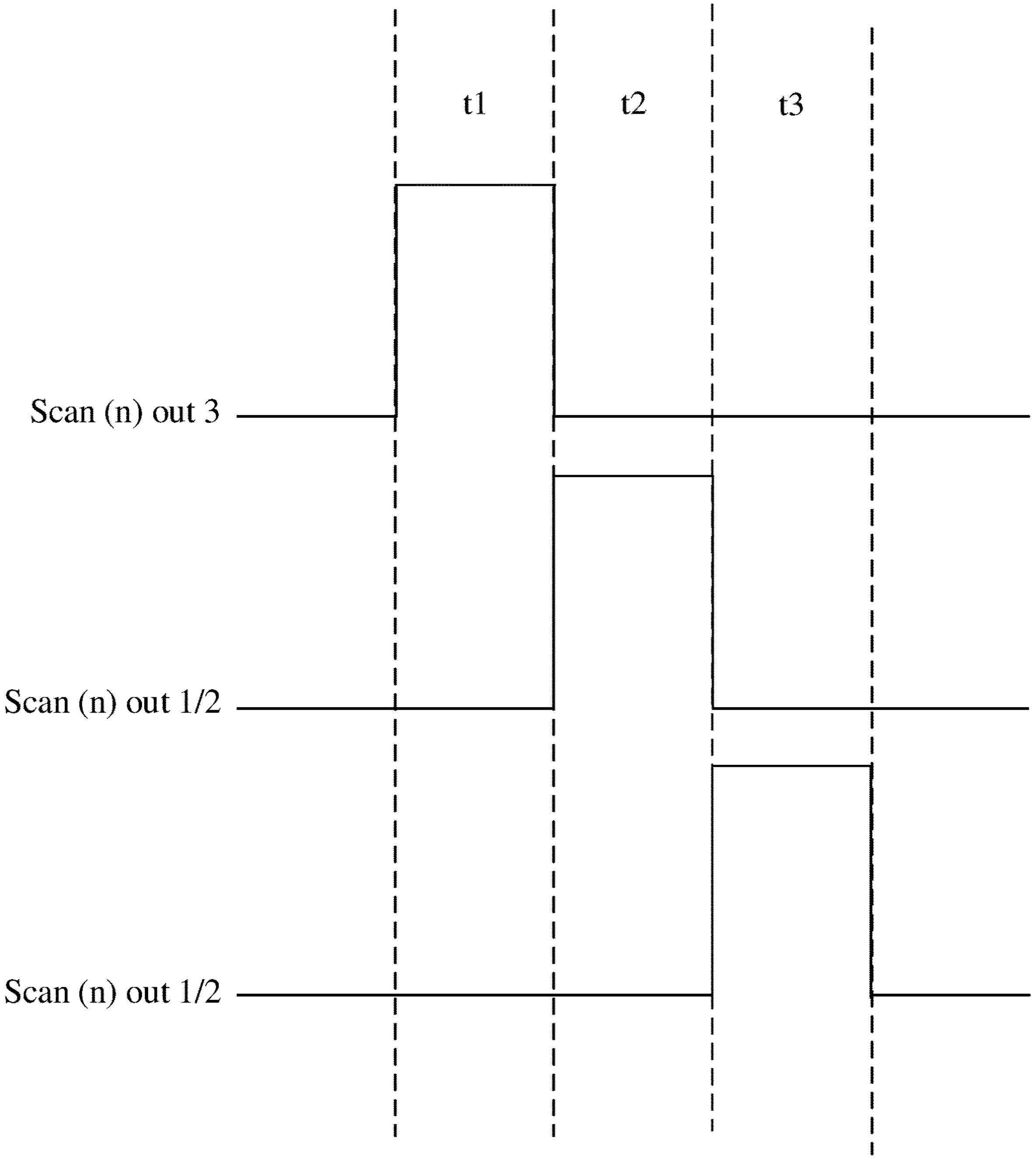
FIG. 7 is a timing diagram of the partial circuit of the pixel array shown in FIG. 6.

The timing diagram corresponding to the partial circuit of the pixel array shown in FIG. 6 is shown in FIG. 7. Specifically, three stages of t1, t2, and t3 in the timing diagram shown in FIG. 7 are selected. The details of the timing diagram of the partial circuit of the pixel array shown in FIG. 7 will be described in subsequent embodiments.

Specifically, "1" represents a high potential and "0" represents a low potential. It should be noted that, "1" and "0" are logic potentials, which are only to better explain the specific working process of the embodiments of the disclosure, rather than the potentials applied to the gates of the transistors in the specific implementation process. In this embodiment, since all the transistors are P-type transistors, the valid signal is a low level signal.

In stage t1, the third scan-drive signal Scan (n) out 3=1, the first scan-drive signal Scan (n) out 1=0, and the second scan-drive signal Scan (n) out 2=0.

Specifically, when the third scan-drive signal Scan (n) out 3 is at a high level, charging of the first pixel sub-unit 1011 and the third pixel sub-unit 1013 or the second pixel sub-unit 1012 in the previous row are completed, and the first reset transistor T3, the fourth reset transistor T3', and the sixth reset transistor T3" are all turned on, the first initialization signal Vint 1 is respectively transmitted to the first storage capacitor Cst, the second storage capacitor Cst', and the third storage capacitor Cst", a display state of the previous frame is cleared, and an initial on-state is invoked.

In stage t2, the third scan-drive signal Scan (n) out 3=0, the first scan-drive signal Scan (n) out 1=1 or 0, and the second scan-drive signal Scan (n) out 2=1 or 0.

Specifically, when the third scan-drive signal Scan (n) out 3 is at a low level, the first scan-drive signal Scan (n) out 1 is at a high level, and the second scan-drive signal Scan (n) out 2 is at a low level, the second light-emitting control transistor T4, the first data control transistor T6, and the second reset transistor T7 are all turned on, and the first reset transistor T3, the fifth light-emitting control transistor T4', the seventh light-emitting control transistor T4", the third data control transistor T6', the fourth data control transistor T6", the fifth reset transistor T7', the seventh reset transistor T7", the fourth reset transistor T3', and the sixth reset transistor T3" are all turned off.

When the third scan-drive signal Scan (n) out 3 is at a low level, the first scan-drive signal Scan (n) out 1 is at a low level, and the second scan-drive signal Scan (n) out 2 is at a high level, the fifth light-emitting control transistor T4', the third data control transistor T6', the fifth reset transistor T7', the seventh light-emitting control transistor T4", the fourth data control transistor T6", and the seventh reset transistor T7" are turned on, and the first reset transistor T3, the second light-emitting control transistor T4, the first data control transistor T6, the second reset transistor T7, the fourth reset transistor T3', and the sixth reset transistor T3" are turned off.

In stage t3, the third scan-drive signal Scan (n) out 3=0, the first scan-drive signal Scan (n) out 1=1 or 0, and the second scan-drive signal Scan (n) out 2=1 or 0.

Specifically, when the third scan-drive signal Scan (n) out 3 is at a low level, the first scan-drive signal Scan (n) out 1 is at a low level, and the second scan-drive signal Scan (n) out 2 is at a high level, the fifth light-emitting control transistor T4', the third data control transistor T6', the fifth reset transistor T7', the seventh light-emitting control transistor T4", the fourth data control transistor T6", and the seventh reset transistor T7" are turned on, and the first reset transistor T3, the second light-emitting control transistor T4, the first data control transistor T6, the second reset transistor T7, the fourth reset transistor T3', and the sixth reset transistor T3" are turned off.

When the third scan-drive signal Scan (n) out 3 is at a low level, the first scan-drive signal Scan (n) out 1 is at a high level, and the second scan-drive signal Scan (n) out 2 is at a low level, the second light-emitting control transistor T4, the first data control transistor T6, and the second reset transistor T7 are all turned on, and the first reset transistor T3, the fifth light-emitting control transistor T4', the seventh light-emitting control transistor T4", the third data control transistor T6', the fourth data control transistor T6", the fifth reset transistor T7', the seventh reset transistor T7", the fourth reset transistor T3', and the sixth reset transistor T3" are all turned off.

In conclusion, in the pixel array, the first pixel sub-unit 1011 is electrically coupled with the individual scan line 10, neither the third pixel sub-unit 1013 nor the second pixel sub-unit 1012 is electrically coupled with the scan line 10 electrically coupled with the first pixel sub-unit 1011, that is, neither the second pixel sub-unit 1012 nor the third pixel sub-unit 1013 will share the scan line 10 with the first pixel sub-unit 1011. Hence, there are only voltages of the first pixel sub-units 1011 on adjacent data lines 30, and thus the voltage on the data line 30 electrically coupled with the second pixel sub-unit 1012 and the voltage on the data line 30 electrically coupled with the third pixel sub-unit 1013 will not generate coupling effects on the voltage on the data line 30 electrically coupled with the first pixel sub-unit 1011. As such, the light emission of the first pixel sub-unit 1011 will not be affected. Therefore, for the pixel array of the disclosure, the problem of gray crush caused by both the voltage on the data line 30 of the G sub-pixel and the voltage on the data line of the B sub-pixel generating coupling effects on the voltage on the data line 30 of the R sub-pixel can be solved. As such, the overall brightness uniformity and stability of the display panel can be effectively improved.

Based on the same inventive concept, the disclosure further provides a display device, which includes the above-mentioned pixel array. The display device may be any electronic device or component with a display function, such as a mobile phone, a tablet computer, a navigator, a display, etc., which is not specifically limited in the disclosure.

The flowchart of the disclosure is only an embodiment, and various modifications may be made to this illustration or the steps in the disclosure without departing from the spirit of the disclosure. For example, the steps may be performed in a different order, or a certain step may be added, deleted, or modified. Those skilled in the art can understand that, the all or part of the processes for realizing the above embodiments and the equivalent changes made according to the claims of the disclosure still belong to the scope covered by the disclosure.

In the description of this specification, the description of the reference terms "an implementation", "some implementations", "exemplary implementations", "examples", "specific examples" or "some examples", etc. mean that a particular feature, structure, material, or characteristic described in combination with the implementation or example is included in at least one implementation or example of the disclosure. In this specification, schematic representations of the above terms do not necessarily refer to the same implementation or example. Furthermore, the particular features, structures, materials, or characteristics described may be combined in a suitable manner in any one or more implementations or examples.

It should be understood that, the application of the disclosure is not limited to the above-mentioned examples, and those of ordinary skill in the art can make improvements or changes according to the above description, and all these improvements and changes should belong to the protection scope of the appended claims of the disclosure. Those of ordinary skill in the art can understand that, all or part of methods for realizing the above embodiments and the equivalent changes made according to the claims of the disclosure still belong to the scope covered by the disclosure.

What is claimed is:

1. A pixel array, comprising a plurality of scan lines, a plurality of emission lines, a plurality of data lines, and a plurality of pixel units, wherein the plurality of data lines are insulated from the plurality of scan lines and the plurality of emission lines;

each of the plurality of pixel units comprises a first pixel sub-unit, a second pixel sub-unit, and a third pixel sub-unit, and the first pixel sub-unit, the second pixel sub-unit, and the third pixel sub-unit are electrically coupled with different data lines;

second pixel sub-units and third pixel sub-units in a same row are electrically coupled with a same scan line, and first pixel sub-units in the same row are not electrically coupled with the same line with the second pixel sub-units and third pixel sub-units in the same row; and second pixel sub-units are located in a same column and electrically coupled with a same data line, third pixel sub-units are located in a same column and electrically coupled with another data line, and first pixel sub-units are located in a same column and electrically coupled with yet another data line;

wherein the first pixel sub-unit comprises a first light-emitting control transistor, a first driving transistor, a first reset transistor, a second light-emitting control transistor, a first switch transistor, a first data control transistor, a second reset transistor, a first storage capacitor, and a first light-emitting diode, wherein a gate of the first light-emitting control transistor is configured to receive a light-emitting control signal, a drain of the first light-emitting control transistor is electrically coupled with a source of the first driving transistor and a source of the second light-emitting control transistor, a source of the first light-emitting control transistor is electrically coupled with a source of the second reset transistor and the first light-emitting diode, and the first light-emitting control transistor is configured to control the first light-emitting diode to emit light;

a gate of the first driving transistor is electrically coupled with a second end of the first storage capacitor, a drain of the first reset transistor, and a drain of the second light-emitting control transistor, a drain of the first driving transistor is electrically coupled with a drain of the first switch transistor and a drain of the first data control transistor, the source of the first driving transistor is electrically coupled with the source of the second light-emitting control transistor, and the first driving transistor is configured to control a magnitude of a current flowing through the first light-emitting diode;

a gate of the first reset transistor is configured to receive a third scan-drive signal, the drain of the first reset transistor is electrically coupled with the second end of the first storage capacitor and the drain of the second light-emitting control transistor, a source of the first reset transistor is configured to receive a first initialization signal, and the first reset transistor is configured to control initialization of a potential of the first storage capacitor;

a gate of the second light-emitting control transistor is configured to receive a first scan-drive signal, the drain of the second light-emitting control transistor is electrically coupled with the second end of the first storage capacitor, and the second light-emitting control transistor is configured to compensate a threshold voltage of the first driving transistor;

a gate of the first switch transistor is configured to receive the light-emitting control signal, the drain of the first switch transistor is electrically coupled with the drain of the first data control transistor, a source of the first switch transistor is configured to receive a first voltage and is electrically coupled with a first end of the first storage capacitor, and the first switch transistor is configured to control to supply the first voltage to the first light-emitting diode;

a gate of the first data control transistor is configured to receive the first scan-drive signal, a source of the first data control transistor is configured to receive a data voltage, and the first data control transistor is configured to control to charge the first storage capacitor with the data voltage;

a gate of the second reset transistor is configured to receive the first scan-drive signal, a drain of the second reset transistor is configured to receive a second initialization signal, the source of the second reset transistor is electrically coupled with the first light-emitting diode, and the second reset transistor is configured to initialize an anode of the first light-emitting diode; and the first end of the first storage capacitor is configured to receive the first voltage, the first storage capacitor is configured to change a voltage at the gate of the first driving transistor, and a cathode of the first light-emitting diode is configured to receive a second voltage, wherein the second pixel sub-unit comprises a fourth light-emitting control transistor, a third driving transistor, a fourth reset transistor, a fifth light-emitting control transistor, a third switch transistor, a third data control transistor, a fifth reset transistor, a second storage capacitor, and a second light-emitting diode, wherein a gate of the fourth light-emitting control transistor is configured to receive the light-emitting control signal, a drain of the fourth light-emitting control transistor is electrically coupled with a source of the third driving transistor and a source of the fifth light-emitting control transistor, a source of the fourth light-emitting control transistor is electrically coupled with a source of the fifth reset transistor and the second light-emitting diode, and the fourth light-emitting control transistor is configured to control the second light-emitting diode to emit light;

a gate of the third driving transistor is electrically coupled with a second end of the second storage capacitor, a drain of the fourth reset transistor, and a drain of the fifth light-emitting control transistor, a drain of the third driving transistor is electrically coupled with a drain of the third switch transistor and a drain of the third data control transistor, the source of the third driving transistor is electrically coupled with the source of the fifth light-emitting control transistor, and the third driving transistor is configured to control a magnitude of a current flowing through the second light-emitting diode;

a gate of the fourth reset transistor is configured to receive the third scan-drive signal, the drain of the fourth reset transistor is electrically coupled with the second end of the second storage capacitor and the drain of the fifth light-emitting control transistor, a source of the fourth reset transistor is configured to receive the first initialization signal, and the fourth reset transistor is configured to control initialization of a potential of the second storage capacitor;

a gate of the fifth light-emitting control transistor is configured to receive a second scan-drive signal, the drain of the fifth light-emitting control transistor is electrically coupled with the second end of the second storage capacitor, and the fifth light-emitting control transistor is configured to compensate a threshold voltage of the third driving transistor;

a gate of the third switch transistor is configured to receive the light-emitting control signal, the drain of the third switch transistor is electrically coupled with the drain of the third data control transistor, a source of the third switch transistor is configured to receive the first voltage and is electrically coupled with a first end of the second storage capacitor, and the third switch transistor is configured to control to supply the first voltage to the second light-emitting diode;

a gate of the third data control transistor is configured to receive the second scan-drive signal, a source of the third data control transistor is configured to receive the data voltage, and the third data control transistor is configured to control to charge the second storage capacitor with the data voltage;

a gate of the fifth reset transistor is configured to receive the second scan-drive signal, a drain of the fifth reset transistor is configured to receive the second initialization signal, the source of the fifth reset transistor is electrically coupled with the second light-emitting diode, and the fifth reset transistor is configured to initialize an anode of the second light-emitting diode; and the first end of the second storage capacitor is configured to receive the first voltage, the second storage capacitor is configured to change a voltage at the gate of the third driving transistor, and a cathode of the second light-emitting diode is configured to receive the second voltage, wherein the third pixel sub-unit comprises a sixth light-emitting control transistor, a fourth driving transistor, a sixth reset transistor, a seventh light-emitting control transistor, a fourth switch transistor, a fourth data control transistor, a seventh reset transistor, a third storage capacitor, and a third light-emitting diode, wherein a gate of the sixth light-emitting control transistor is configured to receive the light-emitting control signal, a drain of the sixth light-emitting control transistor is electrically coupled with a source of the fourth driving transistor and a source of the seventh light-emitting control transistor, a source of the sixth light-emitting control transistor is electrically coupled with a source of the seventh reset transistor and the third light-emitting diode, and the sixth light-emitting control transistor is configured to control the third light-emitting diode to emit light;

a gate of the fourth driving transistor is electrically coupled with a second end of the third storage capacitor, a drain of the sixth reset transistor, and a drain of the seventh light-emitting control transistor, a drain of the fourth driving transistor is electrically coupled with a drain of the fourth switch transistor and a drain of the fourth data control transistor, the source of the fourth driving transistor is electrically coupled with the source of the seventh light-emitting control transistor, and the fourth driving transistor is configured to control a magnitude of a current flowing through the third light-emitting diode;

a gate of the sixth reset transistor is configured to receive the third scan-drive signal, the drain of the sixth reset transistor is electrically coupled with the second end of the third storage capacitor, the gate of the fourth driving transistor, and the drain of the seventh light-emitting control transistor, a source of the sixth reset transistor is configured to receive the first initialization signal, and the sixth reset transistor is configured to control initialization of a potential of the third storage capacitor;

a gate of the seventh light-emitting control transistor is configured to receive the second scan-drive signal, the drain of the seventh light-emitting control transistor is electrically coupled with the second end of the third storage capacitor, and the seventh light-emitting control transistor is configured to compensate a threshold voltage of the fourth driving transistor;

a gate of the fourth switch transistor is configured to receive the light-emitting control signal, the drain of the fourth switch transistor is electrically coupled with the drain of the fourth data control transistor, a source of the fourth switch transistor is configured to receive the first voltage and is electrically coupled with a first end of the third storage capacitor, and the fourth switch transistor is configured to control to supply the first voltage to the third light-emitting diode;

a gate of the fourth data control transistor is configured to receive the second scan-drive signal, a source of the fourth data control transistor is configured to receive the data voltage, and the fourth data control transistor is configured to control to charge the third storage capacitor with the data voltage;

a gate of the seventh reset transistor is configured to receive the second scan-drive signal, a drain of the seventh reset transistor is configured to receive the second initialization signal, the source of the seventh reset transistor is electrically coupled with the third light-emitting diode, and the seventh reset transistor is configured to initialize an anode of the third light-emitting diode; and the first end of the third storage capacitor is configured to receive the first voltage, the third storage capacitor is configured to change a voltage at the gate of the fourth driving transistor, and a cathode of the third light-emitting diode is configured to receive the second voltage.

2. The pixel array of claim 1, wherein the first pixel sub-unit is a red sub-pixel, the second pixel sub-unit is a green sub-pixel, and the third pixel sub-unit is a blue sub-pixel.

3. A display panel, comprising a display region, a non-display region, and a pixel array located in the display region, the pixel array comprising a plurality of scan lines, a plurality of emission lines, a plurality of data lines, and a plurality of pixel units, wherein the plurality of data lines are insulated from the plurality of scan lines and the plurality of emission lines;

each of the plurality of pixel units comprises a first pixel sub-unit, a second pixel sub-unit, and a third pixel sub-unit, and the first pixel sub-unit, the second pixel sub-unit, and the third pixel sub-unit are electrically coupled with different data lines;

second pixel sub-units and/or third pixel sub-units in a same row are electrically coupled with a same scan line, and first pixel sub-units in the same row are not electrically coupled with the same line with the second pixel sub-units and third pixel sub-units in the same row; and second pixel sub-units are located in a same column and electrically coupled with a same data line, third pixel sub-units are located in a same column and electrically coupled with another data line, and first pixel sub-units are located in a same column and electrically coupled with yet another data line;

wherein the first pixel sub-unit comprises a first light-emitting control transistor, a first driving transistor, a first reset transistor, a second light-emitting control transistor, a first switch transistor, a first data control transistor, a second reset transistor, a first storage capacitor, and a first light-emitting diode, wherein a gate of the first light-emitting control transistor is configured to receive a light-emitting control signal, a drain of the first light-emitting control transistor is electrically coupled with a source of the first driving transistor and a source of the second light-emitting control transistor, a source of the first light-emitting control transistor is electrically coupled with a source of the second reset transistor and the first light-emitting diode, and the first light-emitting control transistor is configured to control the first light-emitting diode to emit light;

a gate of the first driving transistor is electrically coupled with a second end of the first storage capacitor, a drain of the first reset transistor, and a drain of the second light-emitting control transistor, a drain of the first driving transistor is electrically coupled with a drain of the first switch transistor and a drain of the first data control transistor, the source of the first driving transistor is electrically coupled with the source of the second light-emitting control transistor, and the first driving transistor is configured to control a magnitude of a current flowing through the first light-emitting diode;

a gate of the first reset transistor is configured to receive a third scan-drive signal, the drain of the first reset transistor is electrically coupled with the second end of the first storage capacitor and the drain of the second light-emitting control transistor, a source of the first reset transistor is configured to receive a first initialization signal, and the first reset transistor is configured to control initialization of a potential of the first storage capacitor;

a gate of the second light-emitting control transistor is configured to receive a first scan-drive signal, the drain of the second light-emitting control transistor is electrically coupled with the second end of the first storage capacitor, and the second light-emitting control transistor is configured to compensate a threshold voltage of the first driving transistor;

a gate of the first switch transistor is configured to receive the light-emitting control signal, the drain of the first switch transistor is electrically coupled with the drain of the first data control transistor, a source of the first switch transistor is configured to receive a first voltage and is electrically coupled with a first end of the first storage capacitor, and the first switch transistor is configured to control to supply the first voltage to the first light-emitting diode;

a gate of the first data control transistor is configured to receive the first scan-drive signal, a source of the first data control transistor is configured to receive a data voltage, and the first data control transistor is configured to control to charge the first storage capacitor with the data voltage;

a gate of the second reset transistor is configured to receive the first scan-drive signal, a drain of the second reset transistor is configured to receive a second initialization signal, the source of the second reset transistor is electrically coupled with the first light-emitting diode, and the second reset transistor is configured to initialize an anode of the first light-emitting diode; and the first end of the first storage capacitor is configured to receive the first voltage, the first storage capacitor is configured to change a voltage at the gate of the first driving transistor, and a cathode of the first light-emitting diode is configured to receive a second voltage, wherein the second pixel sub-unit comprises a fourth light-emitting control transistor, a third driving transistor, a fourth reset transistor, a fifth light-emitting control transistor, a third switch transistor, a third data control transistor, a fifth reset transistor, a second storage capacitor, and a second light-emitting diode, wherein a gate of the fourth light-emitting control transistor is configured to receive the light-emitting control signal, a drain of the fourth light-emitting control transistor is electrically coupled with a source of the third driving transistor and a source of the fifth light-emitting control transistor, a source of the fourth light-emitting control transistor is electrically coupled with a source of the fifth reset transistor and the second light-emitting diode, and the fourth light-emitting control transistor is configured to control the second light-emitting diode to emit light;

a gate of the third driving transistor is electrically coupled with a second end of the second storage capacitor, a drain of the fourth reset transistor, and a drain of the fifth light-emitting control transistor, a drain of the third driving transistor is electrically coupled with a drain of the third switch transistor and a drain of the third data control transistor, the source of the third driving transistor is electrically coupled with the source of the fifth light-emitting control transistor, and the third driving transistor is configured to control a magnitude of a current flowing through the second light-emitting diode;

a gate of the fourth reset transistor is configured to receive the third scan-drive signal, the drain of the fourth reset transistor is electrically coupled with the second end of the second storage capacitor and the drain of the fifth light-emitting control transistor, a source of the fourth reset transistor is configured to receive the first initialization signal, and the fourth reset transistor is configured to control initialization of a potential of the second storage capacitor;

a gate of the fifth light-emitting control transistor is configured to receive a second scan-drive signal, the drain of the fifth light-emitting control transistor is electrically coupled with the second end of the second storage capacitor, and the fifth light-emitting control transistor is configured to compensate a threshold voltage of the third driving transistor;

a gate of the third switch transistor is configured to receive the light-emitting control signal, the drain of the third switch transistor is electrically coupled with the drain of the third data control transistor, a source of the third switch transistor is configured to receive the first voltage and is electrically coupled with a first end of the second storage capacitor, and the third switch transistor is configured to control to supply the first voltage to the second light-emitting diode;

a gate of the third data control transistor is configured to receive the second scan-drive signal, a source of the third data control transistor is configured to receive the data voltage, and the third data control transistor is configured to control to charge the second storage capacitor with the data voltage;

a gate of the fifth reset transistor is configured to receive the second scan-drive signal, a drain of the fifth reset transistor is configured to receive the second initialization signal, the source of the fifth reset transistor is electrically coupled with the second light-emitting diode, and the fifth reset transistor is configured to initialize an anode of the second light-emitting diode; and the first end of the second storage capacitor is configured to receive the first voltage, the second storage capacitor is configured to change a voltage at the gate of the third driving transistor, and a cathode of the second light-emitting diode is configured to receive the second voltage, wherein the third pixel sub-unit comprises a sixth light-emitting control transistor, a fourth driving transistor, a sixth reset transistor, a seventh light-emitting control transistor, a fourth switch transistor, a fourth data control transistor, a seventh reset transistor, a third storage capacitor, and a third light-emitting diode, wherein a gate of the sixth light-emitting control transistor is configured to receive the light-emitting control signal, a drain of the sixth light-emitting control transistor is electrically coupled with a source of the fourth driving transistor and a source of the seventh light-emitting control transistor, a source of the sixth light-emitting control transistor is electrically coupled with a source of the seventh reset transistor and the third light-emitting diode, and the sixth light-emitting control transistor is configured to control the third light-emitting diode to emit light;

a gate of the fourth driving transistor is electrically coupled with a second end of the third storage capacitor, a drain of the sixth reset transistor, and a drain of the seventh light-emitting control transistor, a drain of the fourth driving transistor is electrically coupled with a drain of the fourth switch transistor and a drain of the fourth data control transistor, the source of the fourth driving transistor is electrically coupled with the source of the seventh light-emitting control transistor, and the fourth driving transistor is configured to control a magnitude of a current flowing through the third light-emitting diode;

a gate of the sixth reset transistor is configured to receive the third scan-drive signal, the drain of the sixth reset transistor is electrically coupled with the second end of the third storage capacitor, the gate of the fourth driving transistor, and the drain of the seventh light-emitting control transistor, a source of the sixth reset transistor is configured to receive the first initialization signal, and the sixth reset transistor is configured to control initialization of a potential of the third storage capacitor;

a gate of the seventh light-emitting control transistor is configured to receive the second scan-drive signal, the drain of the seventh light-emitting control transistor is electrically coupled with the second end of the third storage capacitor, and the seventh light-emitting control transistor is configured to compensate a threshold voltage of the fourth driving transistor;

a gate of the fourth switch transistor is configured to receive the light-emitting control signal, the drain of the fourth switch transistor is electrically coupled with the drain of the fourth data control transistor, a source of the fourth switch transistor is configured to receive the first voltage and is electrically coupled with a first end of the third storage capacitor, and the fourth switch transistor is configured to control to supply the first voltage to the third light-emitting diode;

a gate of the fourth data control transistor is configured to receive the second scan-drive signal, a source of the fourth data control transistor is configured to receive the data voltage, and the fourth data control transistor is configured to control to charge the third storage capacitor with the data voltage;

a gate of the seventh reset transistor is configured to receive the second scan-drive signal, a drain of the seventh reset transistor is configured to receive the second initialization signal, the source of the seventh reset transistor is electrically coupled with the third light-emitting diode, and the seventh reset transistor is configured to initialize an anode of the third light-emitting diode; and the first end of the third storage capacitor is configured to receive the first voltage, the third storage capacitor is configured to change a voltage at the gate of the fourth driving transistor, and a cathode of the third light-emitting diode is configured to receive the second voltage.

4. The display panel of claim 3, wherein the display region is used for image display, and the non-display region surrounds the display region.

5. The display panel of claim 3, further comprising a scan-drive circuit, a light-emitting drive circuit, and a data drive circuit which are disposed in the non-display region.

6. The display panel of claim 5, wherein the scan-drive circuit is disposed at one side of the display region, is electrically coupled with the plurality of scan lines, and is configured to output scan control signals through the plurality of scan lines to control the plurality of pixel units to receive data signals for image display.

7. The display panel of claim 5, wherein the light-emitting drive circuit is disposed at another side of the display region, is electrically coupled with the plurality of emission lines, and is configured to output light-emitting control signals through the plurality of emission lines to control the plurality of pixel units to emit light.

8. The display panel of claim 5, wherein the data drive circuit is disposed at yet another side of the display region, is electrically coupled with the plurality of data lines, and is configured to transmit data driving signals to the plurality of pixel units in the form of data voltages through the plurality of data lines.

9. The display panel of claim 3, wherein the first pixel sub-unit is a red sub-pixel, the second pixel sub-unit is a green sub-pixel, and the third pixel sub-unit is a blue sub-pixel.

* * * * *